United States Patent
Matusik et al.

(10) Patent No.: US 6,792,140 B2
(45) Date of Patent: Sep. 14, 2004

(54) IMAGE-BASED 3D DIGITIZER

(75) Inventors: Wojciech Matusik, Arlington, MA (US); Hanspeter Pfister, Somerville, MA (US); Paul Beardsley, Boston, MA (US); Leonard McMillan, Jr., Newton, MA (US)

(73) Assignee: Mitsubish Electric Research Laboratories, Inc., Cambridge, MA (US)

( * ) Notice: Subject to any disclaimer, the term of this patent is extended or adjusted under 35 U.S.C. 154(b) by 663 days.

(21) Appl. No.: 09/842,972

(22) Filed: Apr. 26, 2001

(65) Prior Publication Data

US 2002/0159628 A1 Oct. 31, 2002

(51) Int. Cl.$^7$ ................................................ G06K 9/00
(52) U.S. Cl. ........................ 382/154; 382/173; 382/278; 345/419; 396/155
(58) Field of Search ................................ 382/154, 114, 382/152, 285, 278, 173, 203; 345/475, 582, 619, 426, 419, 427, 581, 428, 501; 356/601, 602, 603; 396/20, 155

(56) References Cited

U.S. PATENT DOCUMENTS 5,870,220 A * 2/1999 Migdal et al. .............. 359/216
6,556,783 B1 * 4/2003 Gelphman ................... 396/20

OTHER PUBLICATIONS

Matusik et al., "Image–Based Visual Hulls"; SIGGRAPH '00, Computer Graphics Proceedings, 2000, pp. 369–374.

Pfister et al., "Surfels: Surface Elements as Rendering Primitives"; SIGGRAPH '00, Computer Graphics Proceedings, 2000, pp. 335–342.

* cited by examiner

Primary Examiner—Jayanti K. Patel
Assistant Examiner—Sheela Chawan
(74) Attorney, Agent, or Firm—Dirk Brinkman

(57) ABSTRACT

A system digitizes a three-dimensional object as a three-dimension model by placing the object on a turntable while taking two sets of corresponding images. The first set of images and the second set of images are obtained while rotating the turntable to a various positions and illuminated the object with the overhead lights and backlights. There is a one to one correspondence for images in each set for each position of the turntable. Object shape data and texture data are respectively extracted from the first and second set of images. The object shape data is correlated with the object texture data to construct the three-dimensional digital model stored in a memory of a computer system.

16 Claims, 3 Drawing Sheets

IMAGE-BASED 3D DIGITIZER

FIELD OF THE INVENTION

The invention relates generally to digital photography, and more particularly to digitizing three-dimensional objects from multiple two-dimensional images to produce computer graphics models.

BACKGROUND OF THE INVENTION

Three-dimensional (3D) digitizers are frequently used to generate computer graphics models. Considerations of resolution, repeatability, accuracy, reliability, speed, and ease of use, as well as overall system cost, are central to the construction of any digitizing system. Often, the design of a digitizing system involves a series of trade-offs between quality and performance.

Traditional 3D dimensional digitizers have focused on geometric quality measures for evaluating system performance. While such measures are objective, they are only indirectly related to an overall goal of a high quality rendition. In most 3D digitizer systems, the rendering quality is largely an indirect result of range accuracy in combination with a small number of photographs used for textures.

Prior art digitizers include contact digitizers, active structured-light range-imaging systems, and passive stereo depth-extraction. For a survey, see Besl, P. J., "Active Optical Range Imaging Sensors," *Advances in Machine Vision*, Springer-Verlag, pp. 1–63, 1989.

Laser triangulation and time-of-flight point digitizers are other popular active digitizing approaches. Laser ranging systems often require a separate registration step to align separately acquired scanned range images. Because active digitizers emit light onto the object being digitized, it is difficult to capture both texture and shape information simultaneously. This introduces the problem of registering the range images with textures.

In other systems, multiple narrow-band illuminates, e.g., red, green, and blue lasers, are used to acquire a surface color estimate along lines-of-sight. However, this is not useful for capturing objects in realistic illumination environments. Passive digitizers, based on stereo-vision, have the advantage that the same source images can be used to acquire both structure and texture, unless the object has insufficient texture.

View-based rendering systems can also be used, see Nishino, K., Y. Sato, and K. Ikeuchi, "Eigen-Texture Method: Appearance Compression based on 3D Model," *Proc. of Computer Vision and Pattern Recognition*, 1:618–624, 1999, and Pulli, K., M. Cohen, T. Duchamp, H. Hoppe, L. Shapiro, and W. Stuetzle, "View-based Rendering: Visualizing Real Objects from Scanned Range and Color Data," *Proceedings of the 8th Eurographics Workshop on Rendering*, pp. 23–34, 1997. In these systems, images and geometry are acquired separately with no explicit consistency guarantees.

Laurentini, in "The visual hull concept for silhouette-based image understanding," *IEEE Transactions on Pattern Analysis and Machine Intelligence*, 16(2), pp. 150–162, 1994, describes a visual hull as the maximal volume that is consistent with a given set of silhouettes. Although, the visual hull cannot represent surface concavities, it provides a conservative estimate of an object's structure. The visual hull process can then interactively generates and shades a sampled approximation of the actual visual hull object from a particular viewpoint, see Matusik, W., C. Buehler, R. Raskar, S. Gortler, and L. McMillan, "Image-Based Visual Hulls," *Computer Graphics*, SIGGRAPH 2000 Proceedings, pp. 369–374, July 2000. The IBVH process is sensitive to changes in ambient lighting conditions, and requires statistical modeling of the background.

Therefore, there is need for a image-based digitizing system that overcomes the problems associated with prior art digitizers.

SUMMARY OF THE INVENTION

The invention provides a digitizing system for acquiring and displaying high-quality graphical models derived from a series of captured images. The system according to the invention differs from most three-dimensional digitizers in that it is not primarily a range-imaging system, Instead, it is a texture-based modeling system.

In essence, the system acquires an approximate three-dimensional model based on the image-based visual hull upon which a view-dependent radiance function is mapped. Both the image-based visual hull and the radiance samples are derived from a common image set. The model can be rendered with a real-time point sample rendering engine based on a point sample representation for visualizing the models.

More specifically, a system digitizes a three-dimensional object as a three-dimension model by placing the object on a turntable while taking two sets of corresponding images. The first set of images and the second set of images are obtained while rotating the turntable to a various positions and illuminated the object with the overhead lights and backlights.

There is a one to one correspondence for images in each set for each position of the turntable. Object shape data and texture data are respectively extracted from the first and second set of images. The object shape data is correlated with the object texture data to construct the three-dimensional digital model stored in a memory of a computer system.

BRIEF DESCRIPTION OF THE DRAWINGS

FIG. 3a is a silhouetted images of an object; and

FIG. 3b is a binary segmentation of the image of FIG. 3a.

DETAILED DESCRIPTION OF THE PREFERRED EMBODIMENT

System Structure

Figure 1:
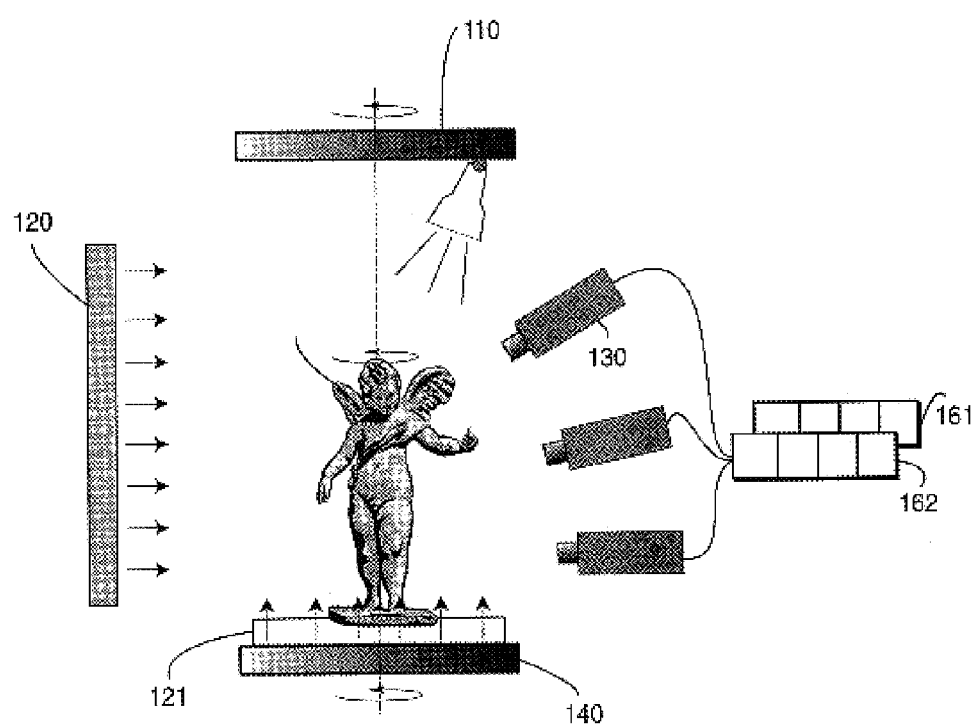
FIG. 1 is a schematic of a digitizing system according to the invention.

FIG. 1 is an overview of a 3D digitizing system 100 according to our invention. The system 100 combines passive and active imaging methods. The system 100 includes texture lights 110, shape lights 120–121, several cameras 130, e.g., three or more, and a transparent or translucent turntable 140. The shape lights are substantially in the view of the cameras, and the texture lights are out of view.

An object 150 to be digitized is placed on the turntable 140. The cameras 130 are pointed at the object from various angles. To facilitate consistent back lighting, we mount the cameras roughly in the same vertical plane as the shape lights 120–121. The back lights 120 are placed opposite the cameras and illuminate the object substantially from behind, as viewed by the cameras. Because the turntable is translucent, the object can also illuminated from below by the back lights 121.

System Operation

During operation of the system 100, the cameras 130 acquire two sets of images 161–162 while the turntable is rotated. The first set 161 is acquired while the object is illuminated by the back lights 120–121, and the second set 162 uses the overhead lights 110. We generally acquire one hundred-eight images per turntable revolution, giving use three images from thirty-six different points of view, i.e., every five degrees of rotation of the turntable. There is an exact one-to-one correspondence, position-wise, for the images in the two sets.

Generally, the method described below converges to within 95% of its final representation after processing about twenty images, and seldom is convergence on the model not reached by thirty images. This convergence is aided by the fact that our sets of images are spherically distributed. The texture lights 121 can remain stationary, or it can be rotated. With the coupled rotation, the images have varied illumination, whereas fixed overhead lights 120 provide images with a constant illumination.

Figure 2:
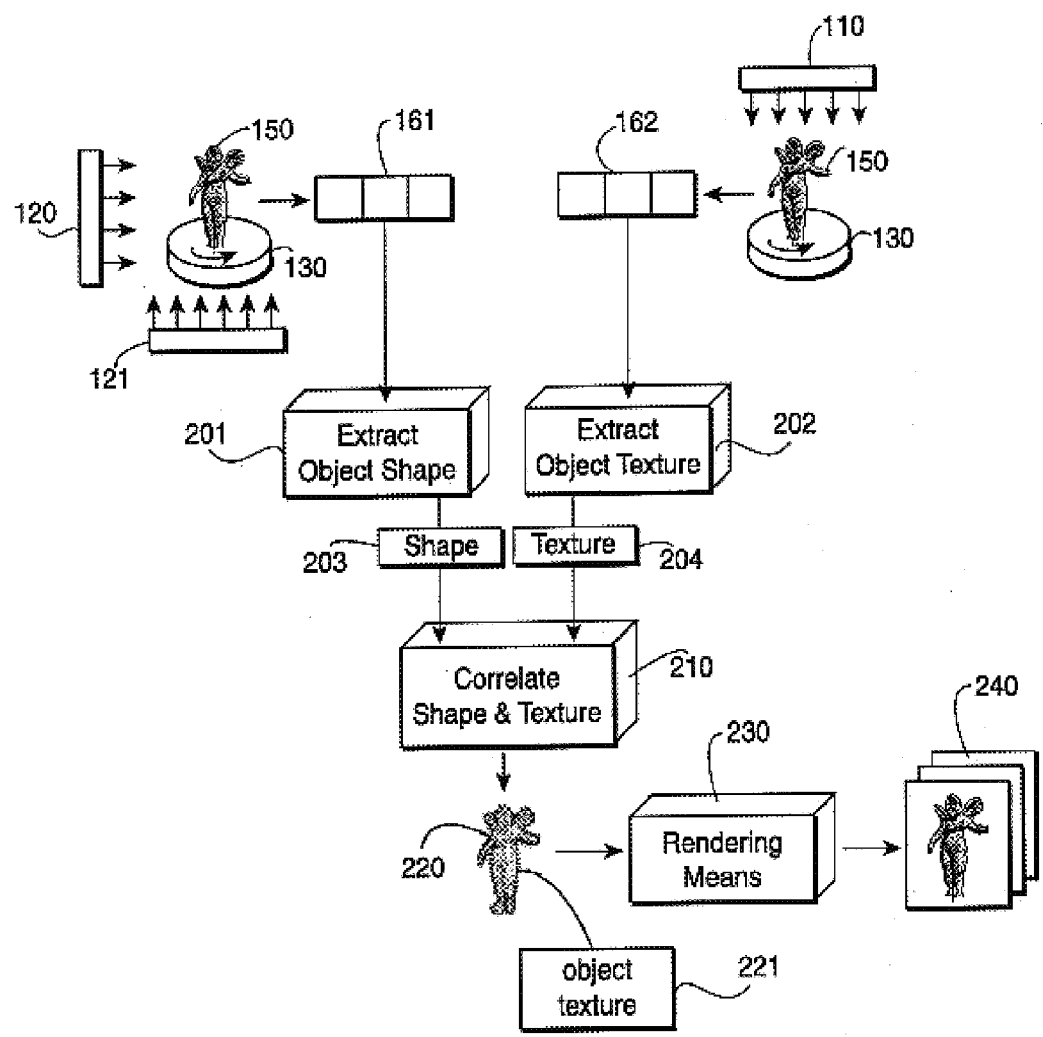
FIG. 2 is a flow diagram of a digitizing method according to the invention.

As shown in FIG. 2, the digitizing starts by placing the object 150 onto the turntable 140 and, if necessary, adjusting the position and aperture of the cameras 130. If any camera adjustments are required, we first acquire images of calibration object, as described below.

Next the object 150 is rotated on the turntable 140 and the first set of images 161 is acquired for various turntable positions. During this first rotation we illuminate the object with the shape lights 120–121. The resulting images are used by active light segmentation means described below. The segmentation means 201 extracts basic shape data 203 of the object 150.

During a second rotation, the second set of images 162 is acquired while illuminating the object with the texture of lights 110. These images are used to extract 202 surface texture data 204 of the object. Repeatability of the turntable positions ensures that the shape data 203 and the texture data 204 are can be registered against each other. The images can also be acquired in an interleaved manner, two image for each turntable position.

The shape and texture data 203–204 extracted from the two acquired image sets are then correlated 210 into a graphics model 220 as a plurality of surface point-samples. Interactive rendering means 230, described in greater detail below, can add view-dependent shading and radiance to generate images 240 of the object from any desired point of view, i.e., views different than the camera positions.

Camera Calibration

To achieve high-accuracy calibration for a particular camera configuration, a known calibration object is used. A 36-image sequence of a calibration object is acquired by each of the cameras 130. A planar homography, $T_{i,p}$, is determined for each visible calibration plane p in each image i, where $T_{i,p}$ describes the mapping between the canonical 2D calibration pattern and the projected view of the pattern.

A first stage of the calibration computes the intrinsic parameters of each camera, using a pinhole camera approximation. Vanishing point/line information is first obtained from the plane homographies, $T_{i,p}$. The use of vanishing point/lines for calibration is well known. The computation of the principal point is known to be ill conditioned with few images, but can be estimated reliably given the large numbers of images, as in our system.

A second stage of the calibration computes the extrinsic parameters, while enforcing constraints on each camera implied by the required motion of equirotations around a fixed axis. The extrinsic parameters have three degrees-of-freed (DOF) for the first of the camera sequences, and six DOF for each of the second sequence. The computation is decomposed into two sets of three DOF systems for tractability. Each system is solved by determining a linear estimate that is then refined by a coarse-to-fine exhaustive search, minimizing a residual, which is based on the epipolar geometry between all cameras.

A quantitative evaluation of the results is obtained by estimating the 3D position, $p_T$, of each point p on the calibration object, from all image views of that point. The distance on the image plane between the original detected location of p and the projection of $p_T$ is computed. This residual is collected for every image in which p is visible and over all points on the object.

For a typical scan, the median residual is 0.52 pixels over all 108 (3×36 images), and 0.27/0.24/0.21 pixels over each individual camera sequence of 36 images each. The significance of this measurement is that the epipolar error propagates directly into errors in 3D reconstruction, or into registration error on textures from multiple images, so a sub-one-pixel error is a desirable result.

Our calibration method does not require that the relative position of the planar patterns on different faces of the calibration object be accurately known. This is a key practical point because it is straightforward to make planar patterns, but a special effort is required the accurate estimate positions of points on such an object.

IBVH Enhancements

The image-based visual hull process, described by Matusik et al., renders unique views of the visual hull directly from the silhouette images in real-time, without constructing an intermediate volumetric as done by the present invention. This is accomplished by computing silhouette cone intersections in image space. The IBVH process takes advantage of the constant cross-section of these silhouette cones. Essentially, each ray of the desired image is projected onto each of the silhouettes. Then, the intervals of the ray's intersection with the silhouette are determined. Next, these intervals are then lifted back into 3D where they are intersected with one another. The advantage of that process is that it does not suffer from the quantization artifacts introduced by discrete volumetric representations. In fact, it produces a result equivalent to constructing the intersection of the actual silhouette cones and rendering them from the point of view of the desired camera. A series of optimizations are discussed that reduce the computational complexity, on average, to a constant cost per pixel rendered.

Segmentation Via Shape Lighting

We modify the visual hull process described above for use with our active digitizer as described below. Hereinafter we call our modified process the active-based visual hull (ABVH) process.

Segmentation is performed on the set of images 161. As stated above, the set 161 is acquired with back and below lighting. Because the shape lights are placed directly in view of the cameras, the camera's sensors are saturated where the lights are visible to produce silhouette images for the set 161. Our cameras have CMOS sensors with mechanical shutters. This eliminates blooming and scan-out smearing artifacts that are common when saturating CCD sensors.

Figures 3A, 3B:
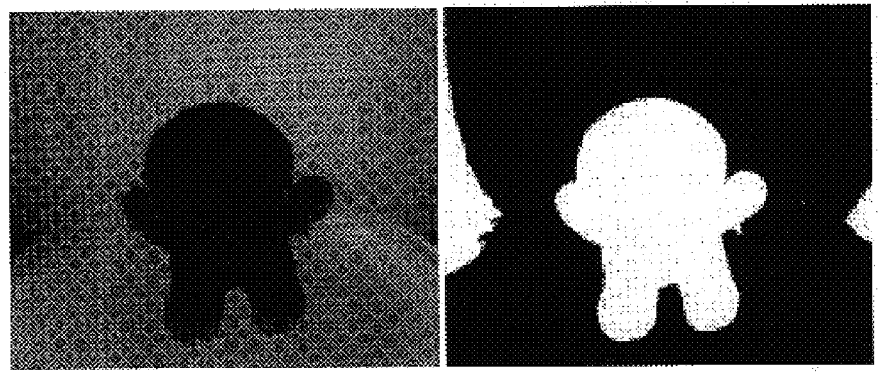

We threshold the silhouette images 161, to establish a binary segmentation for the object 150, see FIGS. 3a and 3b, respectively. The segmentation classifies pixels of each silhoutte image into foreground and background regions. The segmentation intensity threshold can be adjusted as required. Some images in the set may yield a poor segmentation due to specular highlights on the surface of the object. In this case, the manual threshold is set to give a very conservative segmentation, which covers all of the object and parts of the background.

Our ABVH process removes improperly classified foreground regions so long as they are inconsistent with other image. This active segmentation gives far better results than the IBVB process described by Matusik et al. Our process is insensitive to changes in ambient lighting conditions and requires no statistical modeling of the background.

Enhancements to Surfel Rendering

The use of point-samples as rendering primitive for complex geometry was first described by Levoy, M., and T. Whitted in "The Use of Points as Display Primitives," Technical Report TR 85-022, The University of North Carolina at Chapel Hill, Department of Computer Science, 1985. We use a point rendering method similar to one described by Pfister, H., M. Zwicker, J. van Baar, and M. Gross, "Surfels: Surface Elements as Rendering Primitives," *Computer Graphics*, SIGGRAPH 2000 Proceedings, pp. 335–342, 2000. Our digitizing system is capable of rendering objects with rich shapes and textures at interactive frame rates.

Point-samples have several benefits for 3D scanning applications. From a modeling point of view, the point-cloud representation eliminates the need to establish topology or connectivity. This facilitates the fusion of data acquired from the cameras 130. Furthermore, the point-based object representation simplifies rendering requirements when the point set is sufficiently dense. Rendering from a point-based model is preferable to mesh reduction techniques that are used to simplify the geometry because geometric simplification introduces geometric inaccuracy and significant complications when texturing.

We use an extended point-cloud representation that stores all radiance samples visible from the cameras 130. Our scanned objects are represented as a dense set of surface point-samples (surfers). The surfers store depth, texture color, and normal information. In a pre-process, we construct an octree-based representation of the object that is determined from the visual hull samples, as described below.

During rendering, a hierarchical forward-warping process projects the surfers onto an image using splatting techniques, e.g., see L. Westover, "Footprint Evaluation for Volume Rendering," *Computer Graphics*, Proceedings of SIGGRAPH 90, pages 367–376. August 1990. A post-filter in image space reconstructs colors where holes were detected. If a z-buffer is used during visibility splatting, then edge aliasing may occur, and colors may be overly blurred due to the additional 2D post-filtering used to reconstruct the final image. However, in practice these problems are less noticeable due to the high texture fidelity of our models.

Rather than rendering single colors and surface properties, we modify the point renderer to accommodate view-dependent rendering of radiance samples. A process to accelerate view-dependent shading is described below. Due to large number of radiance samples, the size of our point models is quite large. Each sample in our model stores texture data 221 from all texture images, for example, the texture obtained for the sample from all 36 images. Thus, during reconstruction of a view, we take the stored texture for the camera that is the closest to the camera position in the arbitrary reconstruction.

A Point-Sampled Radiance Model

Therefore, we also extend the surfel representation to accommodate the multiple radiance samples that are acquired by our digitizing system 100. We interpolate an outgoing radiance estimate for each point-sample during the rendering process. For points on the visual hull that lie off the actual surface, such as $P_k$, the set of surface rays is more picture-like than radiance-like. Thus, we cannot expect the rays to be as correlated as samples that lie on the actual surface. Thus, we have developed a representation that is well suited to describe both images and radiance functions.

This differs from the surface light-field approach where the surface rays are stored in a form that is tailored for radiance reconstruction. In the limit, one would expect that the surface light-field representation would compress better than our representation because of their more accurate geometry and the greater correlation of their radiance functions. However, in practice, our approach compares favorably. Additional compression details are discussed below.

Our method also handles other difficult surface-radiance cases such as transparency. Instead of relying on accurate geometry, our representation focuses on using large amounts of radiance information to produce accurate renderings of the object. We store all acquired radiance samples in each surfel and choose the closest visible samples during rendering. Our radiance reconstruction works well for difficult cases, such as concavities, reflections, and transparency.

Closest Sample Search

Each point sample (surfel) stores multiple radiance samples, along with a visibility bit vector. The samples are obtained from the set of images 162. The visibility bit vector stores a value of one for each camera position from which the surfel was visible. During rendering, we determine viewing rays from each rendered surfel position to each visible camera. Then, we determine the angle between the viewing ray and each radiance measurement, and choose the radiance sample from the camera with the smallest angle. Thus, the samples well be rendered substantially as they were viewed by the cameras 130.

In 3D, the sets of images 161–162 lie on concentric circles, i.e., the images form rings. For each ring, we determine analytically the point on the circle that best represents a particular surfel. Then, we can simply look up, in constant time, the closest. This process is repeated for each of ring of images. These are then tested for the minimum angle from the desired ray. In an alternative embodiment, the stored texture for several closest images can be averaged.

Compressing Radiance Samples

Because we store all visible radiance samples for each surfels, our initial models are quite large. We provide two different radiance compression processes for reducing this size.

Vector Quantization

For each surfel, we determine the mean value of all radiance samples. We then determine the difference from each radiance sample to this mean. We call these differences radiance residues. If all residues in a surfel fall below a predefined threshold, then we treat the surfel as perfectly diffuse, and store only its mean RGB value. If one or more of the residues is above the threshold, then we mark the residue vector for subsequent vector quantization.

We construct global data for all residues, and store a list of eight-bit entries for each surfel. The compression ratio for this technique has an upper bound of 1:3. The histogram of these difference vectors is highly skewed towards zero, and it is thus well suited to variable length entropy encoding techniques. It is also possible to construct higher dimensional vectors for quantization.

The mean square error (MSE) between the raw radiance values and the vector quantized radiance values is between 4 and 5 units. The visual difference is only visible in extreme close-ups.

Image Set Compression

An alternative compression method merely applies JPEG compression to the original images, with some small optimizations for segmented images. During rendering, we determine rays to the center of each visible camera, and find the center with a line of sight nearest to our desired ray. The corresponding radiance value is then determined by accessing the original image as a texture map. Using JPEG with 50% quality, we can compress each image from 2.25 MB to about 45 kB. For a complete image set of 108 images, this corresponds to 1:50 compression ratio.

This compression can be further improved by removing all 8×8 blocks in the images that lie outside the object's silhouette. This takes advantage of the block transform coding technique used in JPEG compression. For each image, we determine a simple mask by back-projecting all surfels from which this view is visible. Those 8×8 blocks that contain a back-projected surfel are then compressed using JPEG. This simple scheme reduces the average image size to 22 kB for a total compression ratio of 1:100. This compression method exhibits few artifacts and the resulting representations are comparable to those for surface light fields.

Effectively, our system can acquire models from a wide-range of geometric objects and surface types. We can acquire many difficult surfaces including surfaces with concavities and fine scale features. We can also model a wide range of surface materials, including fuzzy, glossy, and transparent materials.

Typically, it takes about twenty minutes to digitize an object. This time is dominated by the transfer speed of the cameras, which takes more than twenty seconds to transfer each uncompressed image. The actual processing times to segment the images and determine the visual hull is less than a two minutes. All of our models are generated from a single scan. Although geometric (polygon) models are quite good, it is clear that the textured models produced by the present invention provide high-resolution models that are repeatable, accurate, and reliable.

We provide a three-dimensional digitizer optimized for the generation of high-quality rendering. Our models derive most of their fidelity from sets of images that are parameterized over the surface of an approximate model. In order to render new views from our models, that are views that are part of the acquired images, we provide a point-cloud rendering process.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system for digitizing a three-dimensional object as a three-dimension model, comprising:

a turntable for placing the object;

a plurality of cameras;

a plurality of texture lights configured out of the view of the plurality of cameras;

a plurality of shape lights configured in the view of the cameras;

means for acquire a first set of images and a second set of images while rotating the turntable to a plurality of positions, the first set of images illuminated by the shape lights and the second set of images illuminated with the texture lights, there being a one to one correspondence for images in each set for each position of the turntable;

means for extracting object shape data from the first set of images;

means for extracting object texture data from the second set of images; and means for correlating the object shape data with the object texture data to construct the three-dimensional digital model stored in a memory of a computer system.

2. The system of claims 1 wherein the texture lights are above the object and above the cameras, and the shape lights are directly opposite the cameras, and the object is between the shape lights and the cameras.

3. The system of claim 2 wherein the turntable is transparent and the shape lights include lights below the turntable to illuminate the object from below.

4. The system of claim 1 wherein the cameras are in a vertical plane directly opposite the shape lights.

5. The system of claim 1 wherein the number of positions is greater than ten.

6. The system of claim 1 wherein the texture lights are rotated while taking the second set of images.

7. The system of claim 1 wherein the digital model is represented as a plurality of point samples.

8. The system of claim 7 wherein the digital model is volumetric.

9. The system of claim 1 wherein the means for extracting object shape data from the first set of images performs a binary segmentation based on a segmentation intensity threshold, the binary segmentation classifying the first set of images into foreground regions and background regions.

10. The system of claim 6 wherein improperly classified background regions are removed.

11. The system of claim 7 further comprising:

means for estimating a radiance of each point sample while rendering the three-dimensional model.

12. The system of claim 1 wherein the object is partially transparent.

13. The system of claim 1 wherein the model is compressed.

14. The system of claim 13 wherein the first and second set of images are compressed by removing of pixels in background regions.

15. The system of claim 7 wherein texture data of each image of the second set is associated with each sample point.

16. A method for digitizing a three-dimensional object as a three-dimension model, comprising:

acquiring a first set of images while illuminating the object with in view lights and rotating the object;

acquiring a second set of images while illuminating the object with out of view lights and rotating the object, there being a one to one correspondence for images in each set for each position of the object;

extracting object shape data from the first set of images;

extracting object texture data from the second set of images; and correlating the object shape data with the object texture data to construct the three-dimensional digital model stored in a memory of a computer system.

* * * * *